United States Patent
Ramprashad et al.

(10) Patent No.: US 12,392,361 B1
(45) Date of Patent: Aug. 19, 2025

(54) CROSS-BLEED SAFETY MECHANISM FOR A LINEAR HYDRAULIC ACTUATOR

(71) Applicant: Hamilton Sundstrand Corporation, Charlotte, NC (US)

(72) Inventors: Sachin Ramprashad, West Hartford, CT (US); Ryan Prescott Susca, Windsor, CT (US)

(73) Assignee: Hamilton Sunstrand Corporation, Charlotte, NC (US)

( * ) Notice: Subject to any disclaimer, the term of this patent is extended or adjusted under 35 U.S.C. 154(b) by 0 days.

(21) Appl. No.: 18/649,445

(22) Filed: Apr. 29, 2024

(51) Int. Cl.
  *F15B 13/04* (2006.01)
  *F16K 11/07* (2006.01)

(52) U.S. Cl.
  CPC .......... *F15B 13/0402* (2013.01); *F16K 11/07* (2013.01); *F15B 2211/329* (2013.01); *F15B 2211/7053* (2013.01)

(58) Field of Classification Search
  CPC .... F15B 13/0402; F15B 13/042; F16K 11/07; F16K 11/0708; Y10T 137/86694
  See application file for complete search history.

(56) References Cited

U.S. PATENT DOCUMENTS

| | | | |
|---|---|---|---|
| 4,630,441 A | 12/1986 | Chamberlain | |
| 5,775,198 A | 7/1998 | Tuttle et al. | |
| 5,975,139 A | 11/1999 | Carroll et al. | |
| 8,061,261 B2 | 11/2011 | Jacobsen et al. | |
| 9,027,589 B2 | 5/2015 | Coolidge | |
| 9,897,112 B2 | 2/2018 | Gomm et al. | |
| 10,384,764 B2 | 8/2019 | Blanc et al. | |
| 10,473,225 B2 | 11/2019 | Defelice et al. | |
| 11,268,542 B2 | 3/2022 | Medina | |
| 2017/0261011 A1* | 9/2017 | Brinkman | F15B 13/0426 |
| 2018/0163888 A1* | 6/2018 | Ishikawa | F16K 11/07 |
| 2021/0010491 A1* | 1/2021 | Reust | F15B 13/0402 |
| 2021/0262491 A1* | 8/2021 | Anton | B60G 17/056 |

* cited by examiner

*Primary Examiner* — Kelsey E Cary
(74) *Attorney, Agent, or Firm* — Kinney & Lange, P.A.

(57) ABSTRACT

Apparatus and associated methods relate to passively limiting a load of a stalled linear hydraulic actuator that actuates a kinematic device. Damage to a stalled linear hydraulic actuator, associated mounting structure(s), any associated linking mechanism(s), and/or a kinematic device controlled thereby can be prevented quickly and without necessarily forfeiting control of the kinematic device. Such damage prevention can be performed using a cross-bleed safety mechanism connected in parallel with the linear hydraulic actuator. The cross-bleed safety mechanism includes a bilaterally moveable spool within a hydraulic cylinder. The bilaterally moveable spool is located between hydraulic chambers that are in fluid communication with corresponding chambers of the linear hydraulic actuator. In response to being sufficiently displaced from an equilibrium position in each direction of movement by a pressure difference thereacross, the bilaterally moveable spool unblocks bypass channels thereby limiting the stalled linear actuator.

20 Claims, 5 Drawing Sheets

CROSS-BLEED SAFETY MECHANISM FOR A LINEAR HYDRAULIC ACTUATOR

BACKGROUND

A linear hydraulic actuator can be used to position a kinematic device, sometimes via an intermediate linking mechanism. A linear hydraulic actuator typically has a bilaterally moveable piston within a hydraulic cylinder. On either side of the bilaterally moveable piston are hydraulic chambers which are typically filled with hydraulic fluid. An unbalanced pressure (i.e., a non-zero differential pressure across the bilaterally moveable piston) applied to the hydraulic fluids in the hydraulic chambers on opposite sides of the bilaterally moveable piston generates a force that can move the bilaterally moveable piston, which can then position the kinematic device coupled thereto. The displacement of the bilaterally moveable piston is in the direction of a central axis of the hydraulic piston. Because hydraulic fluids are typically incompressible (or nearly so), a hydraulic controller of the linear hydraulic actuator can provide precise linear displacement of the bilaterally moveable piston.

Hydraulic systems are used to manipulate or operate various kinematic devices in aircraft, especially larger aircraft. Such kinematic devices, which can be hydraulically manipulated or operated, can include moveable airfoil surfaces, landing gear deployment and retraction mechanisms, turbofan engine control devices, etc. In some scenarios, such kinematic devices can become difficult or impossible to operate. For example, in icing conditions, various flight control surfaces can become frozen, making them inoperable. In another example, Foreign Object Debris (FOD) can be ingested into a turbofan engine, causing damage to stators, which can be rotationally oriented by linear hydraulic actuators. When such kinematic devices are damaged or worn, they can experience binding or higher than normal friction, or they can even become inoperable. Such increased friction and binding can sometimes be overcome, but with greater than the normal load to the linear hydraulic actuator. If the load to the linear hydraulic actuator exceeds the sizing limit of the linear hydraulic actuator, operation of the stalled kinematic device can cause damage to the kinematic device, any linking mechanism, the linear hydraulic actuator, or the mounting of any of these components. When the compromised kinematic devices can be operated only by loads in excess of such a sizing limit of the linear hydraulic actuator, the linear hydraulic actuator can be referred to as a stalled actuator.

A traditional system for preventing damage to the kinematic device, any linking mechanism, the linear hydraulic actuator, or the mounting of any of these components, may include methods of physically disconnecting the linear hydraulic actuator from the kinematic device if the load output is high enough to cause such damage. For example, a linking mechanism can include a shear pin sized to sheer in response to the load of the linear hydraulic actuator exceeding a predetermined threshold. Use of such a sacrificial part, such as, for example, the sheer pin, can result in the kinematic device becoming inoperable following such a sheering event, though. Such inoperability of the kinematic device can result in impaired operation or control of the aircraft.

SUMMARY

Some embodiments relate to a cross-bleed safety mechanism for protecting a hydraulic system. The cross-bleed safety mechanism includes a hydraulic cylinder and a bilaterally moveable spool. The hydraulic cylinder has first and second hydraulic ports configured to provide fluid communication with extend and retract chambers, respectively, of a linear hydraulic actuator when hydraulically coupled thereto. The bilaterally moveable spool is within and provides a hydraulic seal with an interior surface of the hydraulic cylinder. The bilaterally moveable spool is located between a first chamber in fluid communication with the first port and a second chamber in fluid communication with the second port. The bilaterally moveable spool blocks first and second hydraulic bypass channels in response to the bilaterally moveable spool being at an equilibrium position. The first and second hydraulic bypass channels selectively provide fluid communication between first and second chambers. The bilaterally moveable spool blocks the second hydraulic bypass channel and begins to unblock the first hydraulic bypass channel in response to a first differential pressure between the first and second chambers exceeding a first differential cracking pressure. The bilaterally moveable spool blocks the first hydraulic bypass channel and begins to unblock the second hydraulic bypass channel in response to a second differential pressure between the extend and retract chambers exceeding a second differential cracking pressure.

Some embodiments relate to a load-protected linear hydraulic actuator that includes a linear hydraulic actuator and a cross-bleed safety mechanism. The linear hydraulic actuator has an extend chamber and a retract chamber on either side of a bilaterally moveable piston within a first hydraulic cylinder. The extend chamber provides hydraulic fluid via an extend supply/return line. The retract chamber provides hydraulic fluid via a retract supply/return line. The cross-bleed safety mechanism that includes a second hydraulic cylinder. A bilaterally moveable spool is within and provides a hydraulic seal with an interior surface of the hydraulic cylinder. The bilaterally moveable spool is located between a first chamber in fluid communication with the extend chamber of the linear hydraulic actuator and a second chamber in fluid communication with the retract chamber of the linear hydraulic actuator. The bilaterally moveable spool blocks first and second hydraulic bypass channels in response to the bilaterally moveable spool being at an equilibrium position, the first and second hydraulic bypass channels selectively provide fluid communication between first and second chambers. The bilaterally moveable spool blocks the second hydraulic bypass channel and begins to unblock the first hydraulic bypass channel in response to a first differential pressure between the first and second chambers exceeding a first differential cracking pressure. The bilaterally moveable spool blocks the first hydraulic bypass channel and begins to unblock the second hydraulic bypass channel in response to a second differential pressure between the second and first chambers exceeding a second differential cracking pressure.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Apparatus and associated methods relate to passively limiting a load of a stalled actuator that actuates a kinematic device. Damage to a linear hydraulic actuator, associated mounting structure(s), any associated linking mechanism(s), and/or a kinematic device controlled thereby can be prevented quickly and without necessarily forfeiting control of the kinematic device. Such damage prevention can be performed using a cross-bleed safety mechanism connected in parallel with the linear hydraulic actuator. The cross-bleed safety mechanism includes a bilaterally moveable spool within a hydraulic cylinder. The bilaterally moveable spool is located between hydraulic chambers that are in fluid communication with corresponding chambers of the linear hydraulic actuator. In response to being sufficiently displaced from an equilibrium position in each direction of movement by a pressure difference thereacross, the bilaterally moveable spool unblocks bypass channels thereby limiting the stalled actuator.

Figure 1:
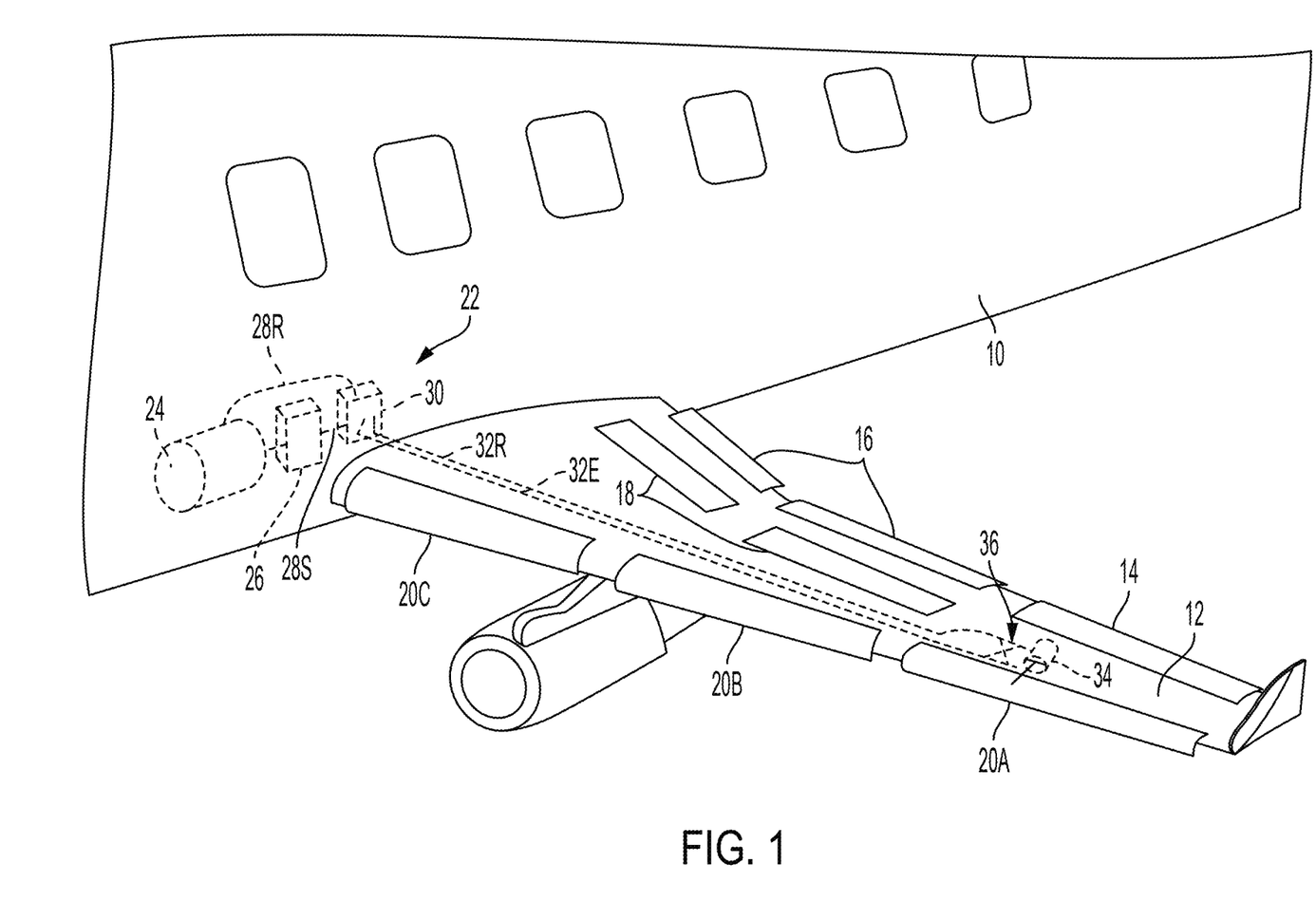
FIG. 1 is a perspective view of an aircraft equipped with a fast-acting system for protecting a linear hydraulic actuator by limiting load output.

FIG. 1 is a perspective view of an aircraft equipped with a fast-acting system for protecting a linear hydraulic actuator by limiting load output. In FIG. 1, aircraft 10 has wing 12 equipped with various flight control surfaces, such as aileron 14, flaps 16, spoilers 18, and leading-edge slats 20A-20C. Leading-edge slat 20A is controlled by slat control system 22. slat control system 22 includes hydraulic reservoir 24, hydraulic pump 26, hydraulic-fluid supply and return lines 28S and 28R, actuator controller 30, extend and retract supply/return lines 32E and 32R, linear hydraulic actuator 34, and cross-bleed safety mechanism 36. Hydraulic reservoir 24 stores hydraulic fluid that can be used in various hydraulic systems, including slat control system 22. Hydraulic pump 26 provides hydraulic fluid to actuator controller 30 via hydraulic-fluid supply line 28S. The hydraulic fluid provided by hydraulic pump 26 is pressurized so as to be usable for positioning various kinematic devices, such as leading-edge slat 20A. Actuator controller 30 directs hydraulic fluid received via hydraulic-fluid supply line 28S to linear hydraulic actuator 34 in a controlled fashion so as to control position of leading-edge slat 20A. Actuator controller 30 returns hydraulic fluid to hydraulic reservoir 24 via hydraulic-fluid return line 28R.

For example, to extend leading-edge slat 20, actuator controller 30 provides pressurized hydraulic fluid to an extend chamber of linear hydraulic actuator 34 via extend supply/return line 32E. By doing so, a bilaterally moveable piston within linear hydraulic actuator 34 will move in a direction toward the lead-edge of wing 12, thereby causing leading-edge slat 20A to extend forward from wing 12. In response to movement of the bilaterally moveable piston in such a direction within linear hydraulic actuator 34, hydraulic fluid will be forced out of a retract chamber of linear hydraulic actuator 34 will return to actuator controller 30 via retract supply/return line 32R. Conversely, to retract leading-edge slat 20, actuator controller 30 provides pressurized hydraulic fluid to the retract chamber of linear hydraulic actuator 34 via retract supply/return line 32R. By doing so, the bilaterally moveable piston within linear hydraulic actuator 34 will move in a direction toward the aft of wing 12, thereby causing leading-edge slat 20A to retract backward to wing 12. In response to movement of the bilaterally moveable piston in such a direction within linear hydraulic actuator 34, hydraulic fluid will be forced out of the extend chamber of linear hydraulic actuator 34 will return to actuator controller 30 via extend supply/return line 32E.

In some embodiments, actuator controller 30 is a closed-loop feedback controller. In such embodiments, actuator controller 30 receives a signal indicative of a position of leading-edge slat 20A. Actuator controller 30 typically compares the position of leading-edge slat 20A, as indicated by the signal received, with a desired position of leading-edge slat 20A. In many embodiments, an error signal is generated, the error signal being a difference between the actual position, as indicated in the signal received, and the desired position commanded by actuator controller 30. This error signal can be used alone, or in combination with a time integral of the error signal, and/or in combination with a time derivative of the error signal (e.g., a proportional (P), proportional-integral (PI), a Proportional-Integral-Derivative (PID) controller, etc.). Should airplane 10 encounter icing conditions during flight, ice can build up on wing 12, especially upon the leading edge of wing 12, where leading-edge slats 20A-20C are located. During such icing events, leading-edge slats 20A-20C can become increasingly difficult to move, if not rendered totally inoperable. Should actuator controller 30 attempt to move leading-edge slat 20A when such a kinematic device is inoperable, the time integral of the error would continue to increase with time, thereby resulting in actuator controller 30 to provide pressurized hydraulic fluid of ever-increasing pressure in an attempt to move leading-edge slat 20A.

To prevent damage to wing 12, linear hydraulic actuator 34 or any mounting devices and/or linking mechanisms associated therewith, cross-bleed safety mechanism 36 is located within or proximate linear hydraulic actuator 34. Cross-bleed safety mechanism 36 is a bilaterally moveable spool valve having two hydraulic bypass channels that provide passive pressure relief within and across linear actuator 34. Each of these two hydraulic bypass channels provides unidirectional pressure relief in response to a pressure differential between the extend and retract chambers of linear hydraulic actuator 34 exceeding a predetermined threshold. One of the two hydraulic bypass channels provides pressure relief in response to a difference in pressures of the hydraulic fluid within the extend and retract chambers. The other of the two hydraulic bypass channels provides pressure relief in response to a difference in pressure of the hydraulic fluid within the retract and extend chambers. Such a configuration of antiparallel-aligned hydraulic bypass channels created by a bilaterally moveable spool valve can be called a cross-coupled pressure relief device.

Moving leading-edge slat 20A is but one application of linear hydraulic actuator 34 and cross-bleed safety mechanism 36. Each of the moveable flight control surfaces depicted in FIG. 1 (i.e., aileron 14, flaps 16, spoilers 18, and leading-edge slats 20A-20C) can be moved by a linear hydraulic actuator, such as linear hydraulic actuator 34. And any linear hydraulic actuator used to control such moveable flight control surfaces can be protected by a cross-bleed safety mechanism, such as cross-bleed safety mechanism 36. Furthermore, linear hydraulic actuators can be used for many other controllable kinematic devices of an aircraft. Turbofan engines can use aircraft fuel as a hydraulic fluid to control many mechanisms in the engine. Such systems can be called fuel-draulic systems. These fuel-draulic systems control various engine mechanisms, such as attitude of stator blades, fuel delivery mechanisms, etc. Such mechanisms can be functionally impaired in response to the engine ingesting foreign object debris (FOD), or in response to wear and tear. Cross-bleed safety mechanisms, such as cross-bleed safety mechanism 36 can be used in fuel-draulic systems as well as for the flight control surfaces described above. Operation of linear hydraulic actuator 34 and cross-bleed safety mechanism 36 will be described in more detail, with reference to FIG. 2 below.

Figure 2:
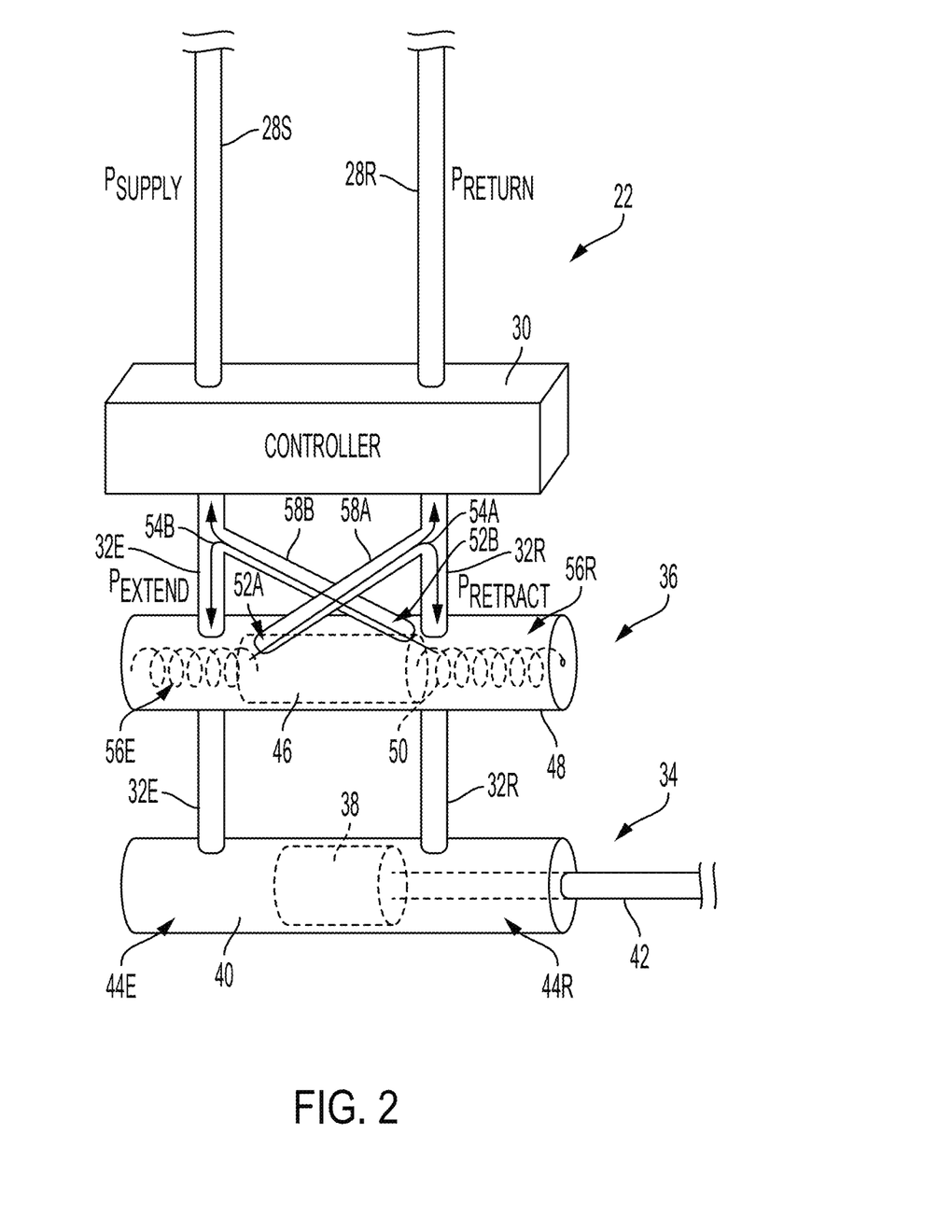
FIG. 2 is a schematic diagram of an embodiment of a hydraulic control equipped with a cross bleed safety mechanism.

FIG. 2 is a schematic diagram of an embodiment of a hydraulic control system equipped with a cross bleed safety mechanism. In FIG. 2, hydraulic control system 22 includes actuator controller 30, linear hydraulic actuator 34 and cross-bleed safety mechanism 36. Actuator controller 30 receives pressurized hydraulic fluid via hydraulic-fluid supply line 28S and returns hydraulic fluid to a hydraulic reservoir via hydraulic-fluid return line 28R. Actuator controller 30 then controllably provides hydraulic fluid to linear hydraulic actuator 34 via extend and retract supply/return lines 32E and 32R. The pressure of hydraulic fluid within extend and retract supply/return lines 32E and 32R varies in response to the activities of the components connected thereto (e.g., actuator controller 30, linear hydraulic actuator 34, and cross-bleed safety mechanism 36) as well as in response to condition of a kinematic device controlled by actuator controller 30.

Linear hydraulic actuator 34 includes bilaterally moveable piston 38 within a hydraulic cylinder 40. Bilaterally moveable piston 38 has a piston rod 42 which can be connected to a kinematic device, either directly or via a linking mechanism. Thus, as bilaterally moveable piston 38 moves within hydraulic cylinder 40, so too does piston rod 42 move, either by extending out of or by retracting into hydraulic cylinder 40. Extend chamber 44E is located within hydraulic cylinder 40 on one side of bilaterally moveable piston 38 opposite the side of bilaterally moveable piston 38 from which piston rod 42 extends. Retract chamber 44R is located within hydraulic cylinder 40 on the side of bilaterally moveable piston 38 from which piston rod 42 extends.

Actuator controller 30 causes bilaterally moveable piston 38 to move toward or into the retract chamber 44R by forcing hydraulic fluid into extend chamber 44E via extend supply/return line 32E. Such movement of bilaterally moveable piston 38 causes extend chamber 44E to grow in volume and causes retract chamber 44R to correspondingly shrink in volume. In response to such movement of bilaterally moveable piston 38, hydraulic fluid is expelled from retract chamber 44R and received by actuator controller 30 via retract supply/return line 32R. Movement of bilaterally moveable piston 38 in such a direction causes piston rod 42 to extend from hydraulic cylinder 40. Conversely, actuator controller 30 causes bilaterally moveable piston 38 to move toward or into the extend chamber 44E by forcing hydraulic fluid into retract chamber 44R via retract supply/return line 32R. Such movement of bilaterally moveable piston 38 causes retract chamber 44R to grow in volume and causes extend chamber 44E to correspondingly shrink in volume. In response to such movement of bilaterally moveable piston 38, hydraulic fluid is expelled from extend chamber 44E and received by actuator controller 30 via extend supply/return line 32E. Movement of bilaterally moveable piston 38 in such a direction causes piston rod 42 to retract into hydraulic cylinder 40.

A kinematic device that becomes inoperable, or at least difficult to move can "stall" linear hydraulic actuator 34 (i.e., cause linear hydraulic actuator 34 be unable to move the kinematic device without producing forces that exceed a design specification). Such an event can result in damage to any elements associated with stalled linear hydraulic actuator 34 (e.g., mounting hardware, linkage, a kinematic device, and/or linear hydraulic actuator 34 itself). Cross-bleed safety mechanism 36 alleviates such risk of damage as will be shown below.

Cross-bleed safety mechanism 36 is a bilaterally moveable spool valve that includes bilaterally moveable spool 46 within a hydraulic cylinder 48. Spring 50 is attached between bilaterally moveable spool 46 within a hydraulic cylinder 48. Spring 50 is attached to bilaterally moveable spool 46 at a first end and attached to hydraulic cylinder 48 at a second end. Spring 50 defines an equilibrium position of bilaterally moveable spool 46 within hydraulic cylinder 48. Such an equilibrium position is one at which spring 50 provides no force upon bilaterally moveable spool 46. Spring 50 does provide return-to-equilibrium-position bilateral forces to bilaterally moveable spool 46 in response to bilaterally moveable spool 46 being positioned at a non-equilibrium position within hydraulic cylinder 48 (thereby either compressing or expanding spring 50). Ports 52A and 52B are located in sidewalls of hydraulic cylinder 48. Ports 52A and 52B function as flow windows, through which, if not blocked, hydraulic fluid can flow. Ports 52A and 52B are blocked by bilaterally moveable spool 46 throughout a range of positions that typically includes the equilibrium position therewithin.

As bilaterally moveable spool 46 moves beyond the range of positions within which bilaterally moveable spool 46 blocks ports 52A and 52B, either port 52A or port 52B will be exposed, depending on direction of movement of bilaterally moveable spool 46. For example, when bilaterally moveable spool 46 is moved to a location where port 52A begins to be exposed, bypass channel 54A will provide fluid conductivity between chambers 56E and 56R, which reside on opposite sides of bilaterally moveable spool 46. Bypass channel 54A provides fluid flow from chamber 56E to chamber 56R via port 52A, hydraulic line 58A, and retract supply/return line 32R. Similarly, when bilaterally moveable spool 46 is moved to a location where port 52B begins to be exposed, bypass channel 54B will provide fluid conductivity between chambers 56R and 56E. Bypass channel 54B provides fluid flow from chamber 56R to chamber 56E via port 52B, hydraulic line 58B and extend supply/return line 32E. Thus, in response to sufficient movement of bilaterally moveable spool 46 so as to expose either one of ports 52A and 52B, a bypass channel, either bypass channel 54A or 54B, will provide fluid conductivity between chambers 56E and 56R, thereby limiting the pressure that can be applied to linear hydraulic actuator 34.

Chambers 56E and 56R are labeled thus because chambers 56E and 56R are in fluid conductivity with extend chamber 44E and retract chamber 44R of linear hydraulic actuator 34, via extend and retract supply/return lines 32E and 32R, respectively. Linear hydraulic actuator 34 and cross-bleed safety mechanism 36 are depicted as being hydraulically connected in parallel between extend supply/return line 32E and retract supply/return line 32R. Because extend supply/return line 32E is connected to both extend chamber 44E of linear hydraulic actuator 34 and chamber 56E of cross-bleed safety mechanism 36, extend chambers 44E is in fluid conductivity with chamber 56E. Similarly, because retract supply/return line 32R is connected to both retract chamber 44R of linear hydraulic actuator 34 and chamber 56R of cross-bleed safety mechanism 36, retract chamber 44R is in fluid conductivity with chamber 56R. Because of such fluid conductivity between corresponding chambers of linear hydraulic actuator 34 and cross-bleed safety mechanism 36, bypass channels 54A and 54B not only provide fluid conductivity between chambers 56E and 56R of cross-bleed safety mechanism 36 but they also provide fluid conductivity between extend chamber 44E and retract chamber 44R of linear hydraulic actuator 34 (in response to bilaterally moveable spool 46 being moved so as to expose either port 52A or 52B).

During normal operation (i.e., when linear hydraulic actuator 34 is not stalled), bypass channels 54A and 54B are blocked by bilaterally moveable spool 46, thereby preventing hydraulic fluid from flowing between extend chamber 44E and retract chamber 44R via bypass channels 54A and 54B. Even if linear hydraulic actuator 34 becomes stalled, resulting in hydraulic controller 30 increasing pressure of hydraulic fluid in one of extend chamber 44E and retract chamber 44R, bilaterally moveable spool 46 of cross-bleed safety mechanism 36 would still be able to move, as bilaterally moveable spool 46 of cross-bleed safety mechanism 36 is not mechanically coupled to the kinematic device causing the stall of linear hydraulic actuator 34. Should hydraulic pressure build to a level sufficient cause bilaterally moveable spool 46 to expose one of ports 52A and 52B, pressure relief would be obtained by bypass channel 54A or 54B, respectively. In other words, by providing bypass channels 54A and 54B for hydraulic fluid, cross-bleed safety mechanism 36 limits a magnitude a pressure differential across bilaterally moveable piston 38 (and between extend chamber 44E and retract chamber 44R of bilaterally moveable piston 38).

The differential pressures required to first expose ports 52A and 52B are called first and second differential cracking pressures, respectively. Such differential cracking pressures corresponding to bypass channels 54A and 54B can be independently tailored by the spring preload and the spring constant of spring 50 and by locations of ports 52A and 52B with respect to the equilibrium position of bilaterally moveable spool 46. Furthermore, the fluid conductivity of bypass channels 54A and 54B can be independently tailored as well. For example, shape of ports 52A and 52B can be made so that a desired fluid conductivity profile is created in response to movements of bilaterally moveable spool 46 beyond first exposures of ports 52A and 52B. For example, ports 52A and 52B can be very narrow when first exposed, and then can broaden in width as more of ports 52A and 52B become exposed. Moreover, cross sectional areas of hydraulic lines 58A and 58B can be made so as to control fluid conductivity of bypass channels 54A and 54B. Using techniques, such as those described above, a relationship between differential pressure and fluid conductivity of bypass channels 54A and 54B can be designed. Such a relationship can be such that differential pressure between extend chamber 44E and retract chamber 44R will not exceed a design specified maximum differential pressure.

In some embodiments, linear hydraulic actuator 34 and cross-bleed safety mechanism 36 are formed within a single housing. For example, in some embodiments, a unitary block can be machined with both hydraulic cylinders 40 and 48. In other embodiments, hydraulic cylinder 48 can be formed using a stationary sleeve, having ports 52A and 52B formed therein. Such ports 52A and 52B would be formed at precise locations so as to provide flow of hydraulic fluid in response to the differential pressures thereof exceeding design pressure differentials.

Figure 5:
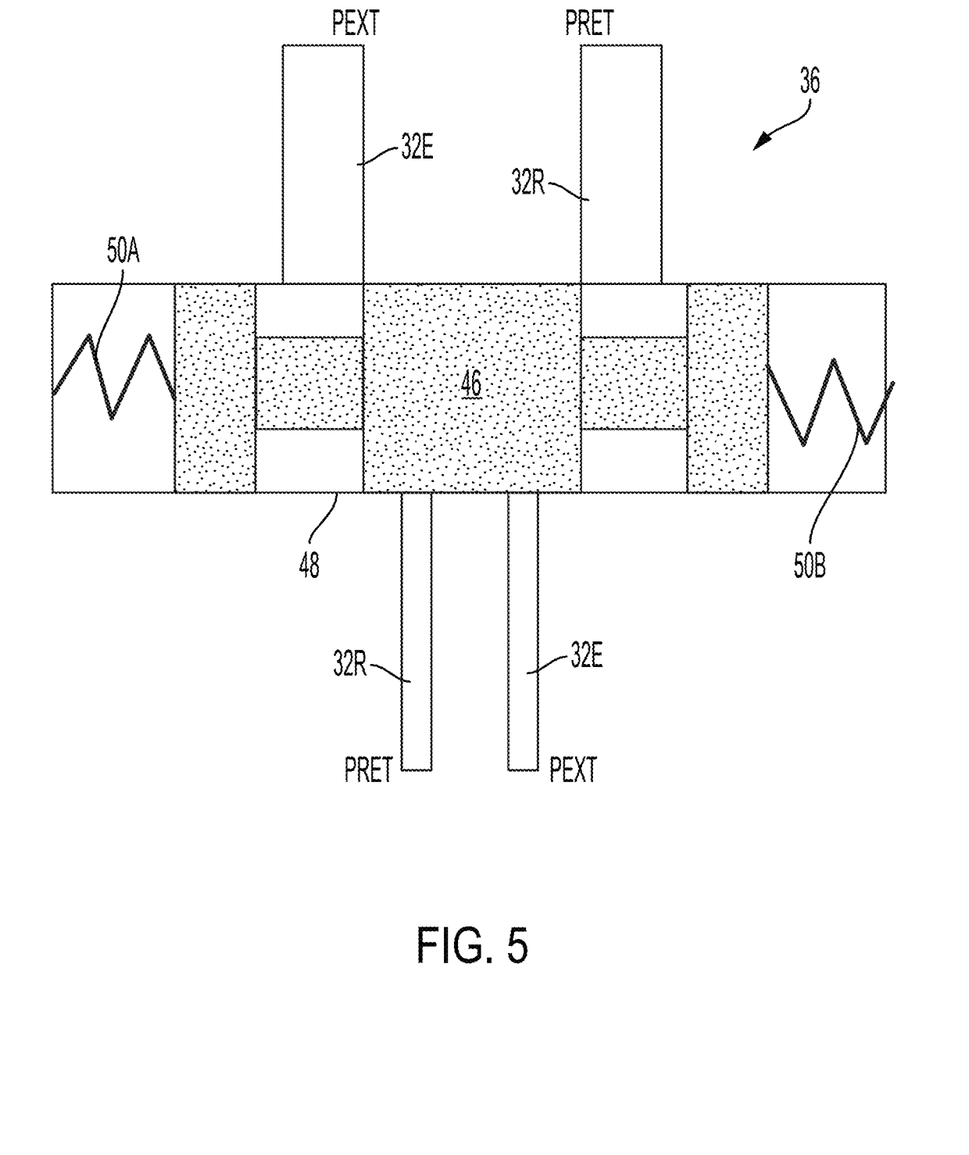
FIG. 5 is a cross sectional diagram of another example of a cross-bleed safety mechanism.

In some embodiments, cross-bleed safety mechanism 46 can be configured such that no fluid flows through the cavity containing spring 50. FIG. 5 depicts such a cross sectional diagram of such a cross-bleed safety mechanism 46. Cross-bleed-safety mechanism 46 includes bilaterally moveable spool 46 within a hydraulic cylinder 48. Cavities in which springs 50A and 50B reside are in fluid communication with extend and return supply/return lines 32E and 32R, respectively. Springs 50A and 50B define an equilibrium position of bilaterally moveable spool 46 within hydraulic cylinder 48. Such an equilibrium position is one at which the combination of springs 50A and 50B provides no net force upon bilaterally moveable spool 46. Springs 50A and 50B do provide return-to-equilibrium-position bilateral forces to bilaterally moveable spool 46 in response to bilaterally moveable spool 46 being positioned at a non-equilibrium position within hydraulic cylinder 48.

Ports at various locations in the sidewalls of hydraulic cylinder 48 provide fluid communication between an interior of hydraulic cylinder 48 and extend supply/return lines 32E and retract supply/return lines 32R. In response to the differential pressure between the pressures in extend supply/return lines 32E and retract supply/return lines 32R increases, bilaterally moveable spool 46 moves to the right. When the differential pressure between the pressures in extend supply/return lines 32E and retract supply/return lines 32R exceeds a predetermined pressure differential, the extract supply/return lines 32E on the top of the FIG. 5 embodiment will be in fluid communication with the retract supply/return lines 32R at the bottom of the FIG. 5 embodiment. Conversely, in response to the differential pressure between the pressures in retract supply/return lines 32R and retract supply/return lines 32E increases, bilaterally moveable spool 46 moves to the left. When the differential pressure between the pressures in retract supply/return lines 32R and extend supply/return lines 32R exceeds a predetermined pressure differential, the retract supply/return lines 32R on the top of the FIG. 5 embodiment will be in fluid communication with the extend supply/return lines 32E at the bottom of the FIG. 5 embodiment.

Figure 3:
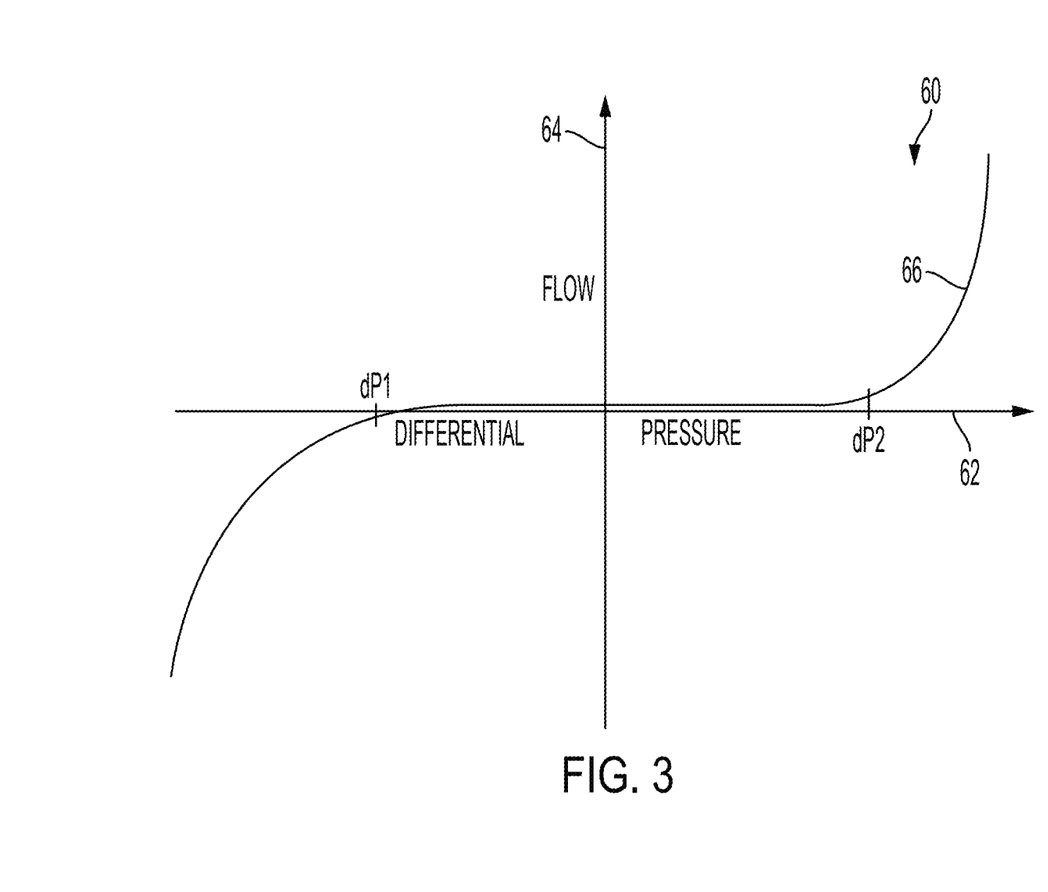
FIG. 3 is a graph of a pressure vs. flow through a hydraulic pressure cross-bleed safety mechanism.

FIG. 3 is a graph of a pressure vs. flow through a hydraulic pressure cross-bleed safety mechanism. In FIG. 3, graph 60 includes horizontal axis 62, vertical axis 64, and pressure-flow relation 66. Horizontal axis 62 is indicative of differential pressure of a hydraulic fluid, as measured between extend chamber 44E and retract chamber 44R. Positive values of differential pressures are indicative pressures of hydraulic fluid in extend chamber 44E that are greater than pressures of hydraulic fluid in retract chamber 44R. Negative values of differential pressures are indicative of pressures of hydraulic fluid in extend chamber 44E that are less than pressures of hydraulic fluid in retract chamber 44R. Vertical axis 64 is indicative of flow through bypass channels 54A or 54B, which then flow to actuator controller 30 via extend and retract supply/return lines 32A and 32B. Positive values of fluid flow are indicative of hydraulic fluid flowing from actuator controller 30 via extend supply/return line 32E, bypass linear hydraulic actuator 34 via bypass channel 54A, and then return to actuator controller 30 via retract supply/return line 32R. Negative values of fluid flow are indicative of hydraulic fluid flowing from actuator controller 30 via retract supply/return line 32R, bypass linear hydraulic actuator 34 via bypass channel 54B, and then return to actuator controller 30 via extend supply/return line 32E.

Pressure-flow relation 66 is inductive of the flow of hydraulic fluid through bypass channels 54A or 54B as a function of differential pressure of the hydraulic fluid, as measured between extend supply/return line 32E and retract supply/return line 32R. Pressure-flow relation 66 indicates no flow through bypass channels 54A or 54B between a first and second differential cracking pressures dP1 and dP2. At differential pressures equal to first differential cracking pressure dP1, fluid flow begins via bypass channel 54B. As differential pressures decrease below first differential cracking pressure dP1, the fluid flow through bypass channel 54B increases in negative fashion. At differential pressures equal to second differential cracking pressure dP2, fluid flow begins via bypass channel 54A. As differential pressures increase above second differential cracking pressure dP2, the fluid flow through bypass channel 54A increases positively. The slope of pressure-flow relation 66 is indicative of fluid conductivity through bypass channel 54A and 54B.

Figure 4:
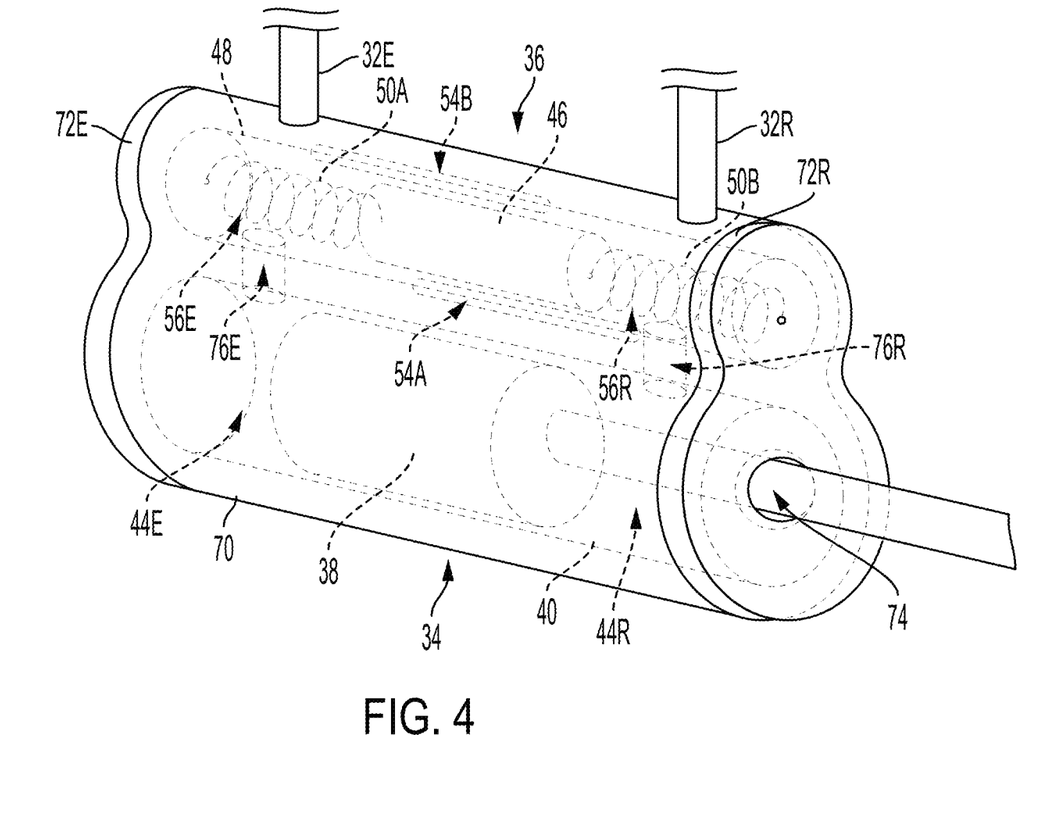
FIG. 4 is a perspective view of an embodiment of a linear hydraulic actuator equipped with an integrated cross bleed safety mechanism.

FIG. 4 is a perspective view of an embodiment of a linear hydraulic actuator equipped with an integrated cross bleed safety mechanism. In FIG. 4, linear hydraulic actuator 34 and integrated cross-bleed bypass mechanism 36 are integrated in a machined block. Hydraulic cylinders 40 and 48 corresponding to linear hydraulic actuator 34 and integrated cross-bleed bypass mechanism 36, respectively, are machined in unitary block 70. Ends of hydraulic cylinders 40 and 48 can hydraulically sealed with endcaps 72E and 72R. Bilaterally moveable piston 38 and bilaterally moveable spool 46 are located in hydraulic cylinders 40 and 48, respectively. Bilaterally moveable piston 38 is coupled to piston rod 42, which can in turn be configured to move a kinematic device. Piston rod 42 extends from hydraulic cylinder 46, emerging therefrom via piston rod port 74.

Spring 50A and 50B attached between and at opposite ends of both bilaterally moveable spool 46 and hydraulic cylinder 48 at endcaps 72E and 72R, respectively. Springs 50A and 50B define an equilibrium position of bilaterally moveable spool 46 within hydraulic cylinder 48. Such an equilibrium position is one at which the combination of springs 50A and 50B provides no net force upon bilaterally moveable spool 46. Springs 50A and 50B do provide return-to-equilibrium-position bilateral forces to bilaterally moveable spool 46 in response to bilaterally moveable spool 46 being positioned at a non-equilibrium position within hydraulic cylinder 48. Bypass channels 54A and 54B are formed as depressions or channels formed in sidewalls of hydraulic cylinder 48. Bypass channels 54A and 54B are blocked by bilaterally moveable spool 46 throughout a range of positions that typically includes the equilibrium position therewithin.

Extend chamber 44E of linear hydraulic actuator 34 and chamber 56E of cross-bleed bypass mechanism 36 are in fluid communication with one another via port 76E. Similarly, retract chamber 44R of linear hydraulic actuator 34 and chamber 56R of cross-bleed bypass mechanism 36 are in fluid communication with one another via port 76R. bypass channels 54A and 54B are formed as depressions or channels in sidewalls of hydraulic cylinder 48. Such depression or channel corresponding to bypass channel 54A extends from an initial location, where it is blocked when bilaterally moveable spool 46 is in the equilibrium position, to a location within retract chamber 56R. Similarly, the depression corresponding to bypass channel 54B extends from an initial location, where it is blocked when bilaterally moveable spool 46 is in the equilibrium position, to a location within extend chamber 56E. The cross-sectional area of such depressions can be tailored so that a desired pressure-flow relation results from such a geometry. Although in the embodiment depicted in FIG. 4 bypass channels 54A and 54B are formed as depressions or channels in the sidewall of hydraulic cylinder 48, in another embodiment, such bypass channels 54A and 54B can be formed using holes drilled or formed adjacent to hydraulic cylinder 48.

Discussion of Possible Embodiments

The following are non-exclusive descriptions of possible embodiments of the present invention.

Some embodiments relate to a cross-bleed safety mechanism for protecting a hydraulic system. The cross-bleed safety mechanism includes a hydraulic cylinder and a bilaterally movable bilaterally moveable piston. The hydraulic cylinder has first and second hydraulic ports configured to provide fluid communication with extend and retract chambers, respectively, of a linear hydraulic actuator when hydraulically coupled thereto. The bilaterally moveable spool is within and provides a hydraulic seal with an interior surface of the hydraulic cylinder. The bilaterally moveable spool is located between a first chamber in fluid communication with the first port and a second chamber in fluid communication with the second port. The bilaterally moveable spool blocks first and second hydraulic bypass channels in response to the bilaterally moveable spool being at an equilibrium position. The first and second hydraulic bypass channels selectively provide fluid communication between first and second chambers. The bilaterally moveable spool blocks the second hydraulic bypass channel and begins to unblock the first hydraulic bypass channel in response to a first differential pressure between the first and second chambers exceeding a first differential cracking pressure. The bilaterally moveable spool blocks the first hydraulic bypass channel and begins to unblock the second hydraulic bypass channel in response to a second differential pressure between the extend and retract chambers exceeding a second differential cracking pressure.

The system of the preceding paragraph can optionally include, additionally and/or alternatively, any one or more of the following features, configurations and/or additional components:

A further embodiment of the foregoing system can further include a spring attached to the bilaterally moveable spool at a first end and attached to the hydraulic cylinder at a second end, the spring defining the equilibrium position of the bilaterally moveable spool within the hydraulic cylinder and providing a return-to-equilibrium-position bilateral force to the bilaterally moveable spool in response to the bilaterally moveable spool being positioned at a non-equilibrium position within the hydraulic cylinder.

A further embodiment of any of the foregoing systems, wherein the spring can have a spring constant that provides a force on the bilaterally moveable spool that counterbalances the first differential cracking pressure when the bilaterally moveable spool begins to unblock the first hydraulic bypass channel.

A further embodiment of any of the foregoing systems, wherein the spring can have a spring constant that provides a force on the bilaterally moveable spool that counterbalances the second differential cracking pressure when the bilaterally moveable spool begins to unblock the second hydraulic bypass channel.

A further embodiment of any of the foregoing systems, wherein the first bypass channel can be a hydraulic path extending from a first port or depression in a sidewall of the hydraulic cylinder to the first chamber of the hydraulic cylinder. The first port or depression can be selectively blocked or unblocked by the bilaterally moveable spool in response to position of the bilaterally moveable piston.

A further embodiment of any of the foregoing systems, wherein the first bypass channel can facilitate flow of hydraulic fluid from the first chamber to the second chamber in response to the first bypass channel being unblocked.

A further embodiment of any of the foregoing systems, wherein the first bypass channel can be in fluid communication with the first chamber.

A further embodiment of any of the foregoing systems, wherein the second bypass channel can be a hydraulic path extending from a second port or depression in a sidewall of the hydraulic cylinder to the second chamber of the hydraulic cylinder. The second port or depression can be selectively blocked or unblocked by the bilaterally moveable spool in response to position of the bilaterally moveable piston.

A further embodiment of any of the foregoing systems, wherein the second bypass channel can facilitate flow of hydraulic fluid from the second chamber to the first chamber in response to the first bypass channel being unblocked.

A further embodiment of any of the foregoing systems, wherein the second bypass channel can be in fluid communication with the second chamber.

A further embodiment of any of the foregoing systems, wherein the first and second bypass channels can be formed as depressions in the sidewall of the of the hydraulic cylinder.

A further embodiment of any of the foregoing systems, wherein the first and second bypass channels can be formed via ports in the sidewall of the of the hydraulic cylinder.

Some embodiments relate to a load-protected linear hydraulic actuator that includes a linear hydraulic actuator and a cross-bleed safety mechanism. The linear hydraulic actuator has an extend chamber and a retract chamber on either side of a bilaterally moveable piston within a first hydraulic cylinder. The extend chamber provides hydraulic fluid via an extend supply/return line. The retract chamber provides hydraulic fluid via a retract supply/return line. The cross-bleed safety mechanism that includes a second hydraulic cylinder. A bilaterally moveable spool is within and provides a hydraulic seal with an interior surface of the hydraulic cylinder. The bilaterally moveable spool is located between a first chamber in fluid communication with the extend chamber of the linear hydraulic actuator and a second chamber in fluid communication with the retract chamber of the linear hydraulic actuator. The bilaterally moveable spool blocks first and second hydraulic bypass channels in response to the bilaterally moveable spool being at an equilibrium position, the first and second hydraulic bypass channels selectively provide fluid communication between first and second chambers. The bilaterally moveable spool blocks the second hydraulic bypass channel and begins to unblock the first hydraulic bypass channel in response to a first differential pressure between the first and second chambers exceeding a first differential cracking pressure. The bilaterally moveable spool blocks the first hydraulic bypass channel and begins to unblock the second hydraulic bypass channel in response to a second differential pressure between the second and first chambers exceeding a second differential cracking pressure.

The system of the preceding paragraph can optionally include, additionally and/or alternatively, any one or more of the following features, configurations and/or additional components:

A further embodiment of the foregoing system, wherein the first and second hydraulic cylinders can be formed within a unitary body.

A further embodiment of any of the foregoing systems can further include a piston rod coupled to the bilaterally moveable piston and extending from the first cylindrical housing. The piston rod configured to link to a kinematic device.

A further embodiment of any of the foregoing systems can further include a spring attached to the bilaterally moveable spool at a first end and attached to the hydraulic cylinder at a second end. The spring defines the equilibrium position of the bilaterally moveable spool within the hydraulic cylinder and providing a return-to-equilibrium-position bilateral force to the bilaterally moveable spool in response to the bilaterally moveable spool being positioned at a non-equilibrium position within the hydraulic cylinder.

A further embodiment of any of the foregoing systems, wherein the spring can have a spring constant that provides a force on the bilaterally moveable spool that counterbalances the first differential cracking pressure when the bilaterally moveable spool begins to unblock the first hydraulic bypass channel.

A further embodiment of any of the foregoing systems, wherein the spring can have a spring constant that provides a force on the bilaterally moveable spool that counterbalances the second differential cracking pressure when the bilaterally moveable spool begins to unblock the second hydraulic bypass channel.

A further embodiment of any of the foregoing systems, wherein the first bypass channel can be a hydraulic path extending from a first port or depression in a sidewall of the hydraulic cylinder to the first chamber of the hydraulic cylinder. The first port or depression can be selectively blocked or unblocked by the bilaterally moveable spool in response to position of the bilaterally moveable spool.

A further embodiment of any of the foregoing systems, wherein the actuator controller can include a Proportional Integral (PI) control algorithm that generates a control signal in response to a difference between a desired position and an actual position of the bilaterally moveable piston as indicated by the signal indicative of the position of the bilaterally moveable spool.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A cross-bleed safety mechanism for protecting a hydraulic system, the cross-bleed safety mechanism including:
    a hydraulic cylinder having first and second hydraulic ports configured to provide fluid communication with extend and retract chambers, respectively, of a linear hydraulic actuator when hydraulically coupled thereto; and a bilaterally moveable spool within and providing a hydraulic seal with an interior surface of the hydraulic cylinder, the bilaterally moveable spool located between a first chamber in fluid communication with the first port and a second chamber in fluid communication with the second port, wherein the bilaterally moveable spool:
blocks first and second hydraulic bypass channels in response to the bilaterally moveable spool being at an equilibrium position, the first and second hydraulic bypass channels selectively provide fluid communication between first and second chambers,
blocks the second hydraulic bypass channel and begins to unblock the first hydraulic bypass channel in response to a first differential pressure between the first and second chambers exceeding a first differential cracking pressure, and
blocks the first hydraulic bypass channel and begins to unblock the second hydraulic bypass channel in response to a second differential pressure between the second and first chambers exceeding a second differential cracking pressure.

2. The cross-bleed safety mechanism of claim 1, further comprising:
a spring attached to the bilaterally moveable spool at a first end and attached to the hydraulic cylinder at a second end, the spring defining the equilibrium position of the bilaterally moveable spool within the hydraulic cylinder and providing a return-to-equilibrium-position bilateral force to the bilaterally moveable spool in response to the bilaterally moveable spool being positioned at a non-equilibrium position within the hydraulic cylinder.

3. The cross-bleed safety mechanism of claim 2, wherein the spring has a spring constant that provides a force on the bilaterally moveable spool that counterbalances the first differential cracking pressure when the bilaterally moveable spool begins to unblock the first hydraulic bypass channel.

4. The cross-bleed safety mechanism of claim 2, wherein the spring has a spring constant that provides a force on the bilaterally moveable spool that counterbalances the second differential cracking pressure when the bilaterally moveable spool begins to unblock the second hydraulic bypass channel.

5. The cross-bleed safety mechanism of claim 1, wherein the first bypass channel is a hydraulic path extending from a first port or depression in a sidewall of the hydraulic cylinder to the first chamber of the hydraulic cylinder, the first port or depression being selectively blocked or unblocked by the bilaterally moveable spool in response to position of the bilaterally moveable piston.

6. The cross-bleed safety mechanism of claim 5, wherein the first bypass channel facilitates flow of hydraulic fluid from the first chamber to the second chamber in response to the first bypass channel being unblocked.

7. The cross-bleed safety mechanism of claim 6, wherein the first bypass channel is in fluid communication with the first chamber.

8. The cross-bleed safety mechanism of claim 5, wherein the first and second bypass channels are formed as depressions in the sidewall of the of the hydraulic cylinder.

9. The cross-bleed safety mechanism of claim 5, wherein the first and second bypass channels are formed via ports in the sidewall of the of the hydraulic cylinder.

10. The cross-bleed safety mechanism of claim 1, wherein the second bypass channel is a hydraulic path extending from a second port or depression in a sidewall of the hydraulic cylinder to the second chamber of the hydraulic cylinder, the second port or depression being selectively blocked or unblocked by the bilaterally moveable spool in response to position of the bilaterally moveable piston.

11. The cross-bleed safety mechanism of claim 10, wherein the second bypass channel facilitates flow of hydraulic fluid from the second chamber to the first chamber in response to the first bypass channel being unblocked.

12. The cross-bleed safety mechanism of claim 11, wherein the second bypass channel is in fluid communication with the second chamber.

13. A load-protected linear hydraulic actuator comprising:
a linear hydraulic actuator having an extend chamber and a retract chamber on either side of a bilaterally moveable piston within a first hydraulic cylinder, the extend chamber provided hydraulic fluid via an extend supply/return line, the retract chamber provided hydraulic fluid via a retract supply/return line; and
a cross-bleed safety mechanism that includes:
a second hydraulic cylinder; and
a bilaterally moveable spool within and providing a hydraulic seal with an interior surface of the hydraulic cylinder, the bilaterally moveable spool located between a first chamber in fluid communication with the extend chamber of the linear hydraulic actuator and a second chamber in fluid communication with the retract chamber of the linear hydraulic actuator, wherein the bilaterally moveable spool:
blocks first and second hydraulic bypass channels in response to the bilaterally moveable spool being at an equilibrium position, the first and second hydraulic bypass channels selectively provide fluid communication between first and second chambers,
blocks the second hydraulic bypass channel and begins to unblock the first hydraulic bypass channel in response to a first differential pressure between the first and second chambers exceeding a first differential cracking pressure, and
blocks the first hydraulic bypass channel and begins to unblock the second hydraulic bypass channel in response to a second differential pressure between the second and first chambers exceeding a second differential cracking pressure.

14. The load-protected linear hydraulic actuator of claim 13, wherein the first and second hydraulic cylinders are formed within a unitary body.

15. The load-protected linear hydraulic actuator of claim 13, further comprising:
a piston rod coupled to the bilaterally moveable piston and extending from the first cylindrical housing; the piston rod configured to link to a kinematic device.

16. The load-protected linear hydraulic actuator of claim 13, further comprising:
a spring attached to the bilaterally moveable spool at a first end and attached to the hydraulic cylinder at a second end, the spring defining the equilibrium position of the bilaterally moveable spool within the hydraulic cylinder and providing a return-to-equilibrium-position bilateral force to the bilaterally moveable spool in response to the bilaterally moveable spool being positioned at a non-equilibrium position within the hydraulic cylinder.

17. The load-protected linear hydraulic actuator of claim 16, wherein the spring has a spring constant that provides a force on the bilaterally moveable spool that counterbalances the first differential cracking pressure when the bilaterally moveable spool begins to unblock the first hydraulic bypass channel.

18. The load-protected linear hydraulic actuator of claim 16, wherein the spring has a spring constant that provides a force on the bilaterally moveable spool that counterbalances the second differential cracking pressure when the bilaterally moveable spool begins to unblock the second hydraulic bypass channel.

19. The load-protected linear hydraulic actuator of claim 13, wherein the first bypass channel is a hydraulic path extending from a first port or depression in a sidewall of the hydraulic cylinder to the first chamber of the hydraulic cylinder, the first port or depression being selectively blocked or unblocked by the bilaterally moveable spool in response to position of the bilaterally moveable piston.

20. The load-protected linear hydraulic actuator of claim 13, wherein the actuator controller includes:
  a Proportional Integral (PI) control algorithm that generates a control signal in response to a difference between a desired position and an actual position of the bilaterally moveable piston as indicated by the signal indicative of the position of the bilaterally moveable piston.

* * * * *